J., A. & J. P. BARKER.
CHAIR.
APPLICATION FILED APR. 29, 1907.
1,048,274.
Patented Dec. 24, 1912.
5 SHEETS—SHEET 5.
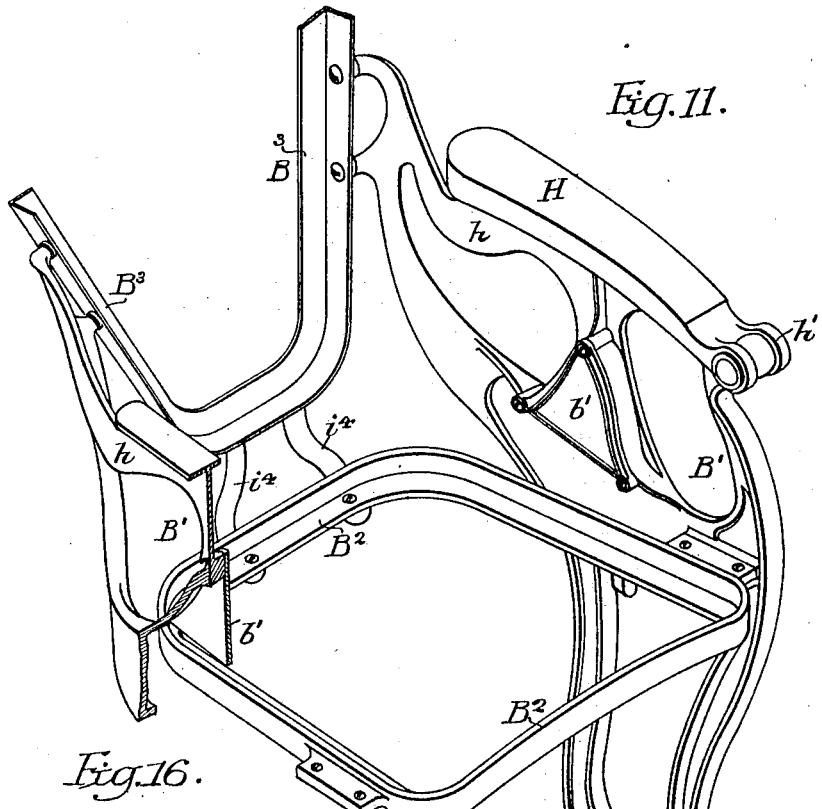
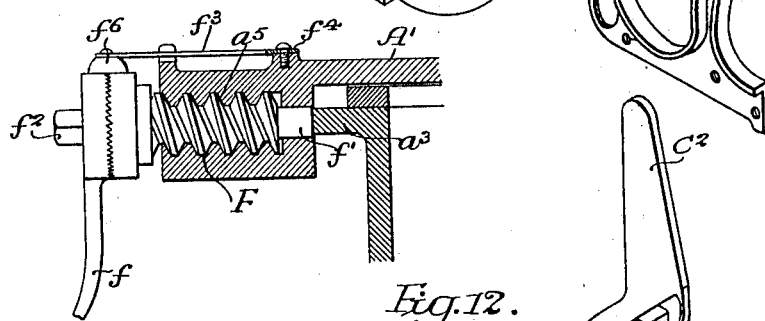
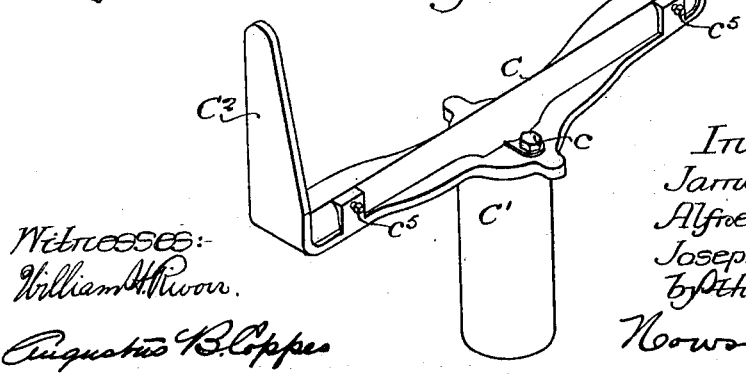

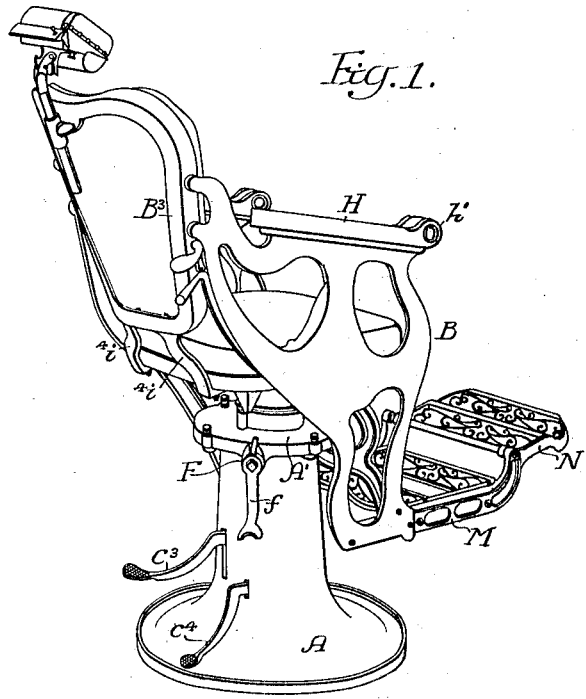
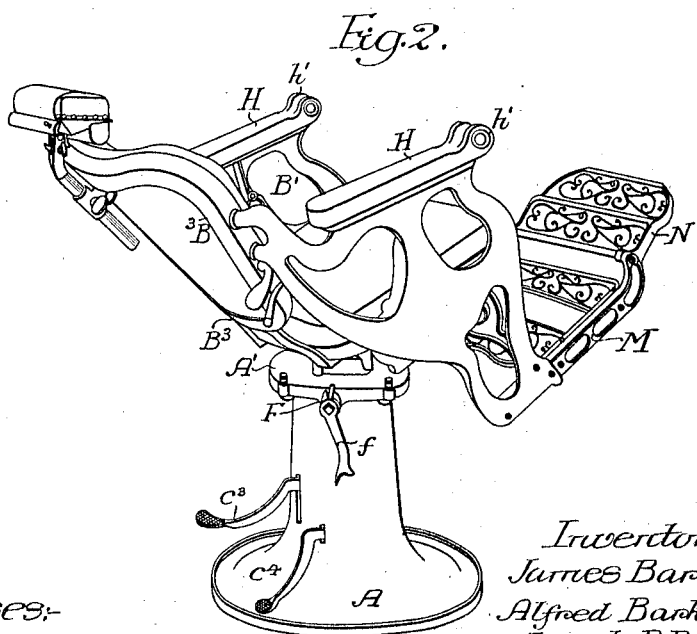

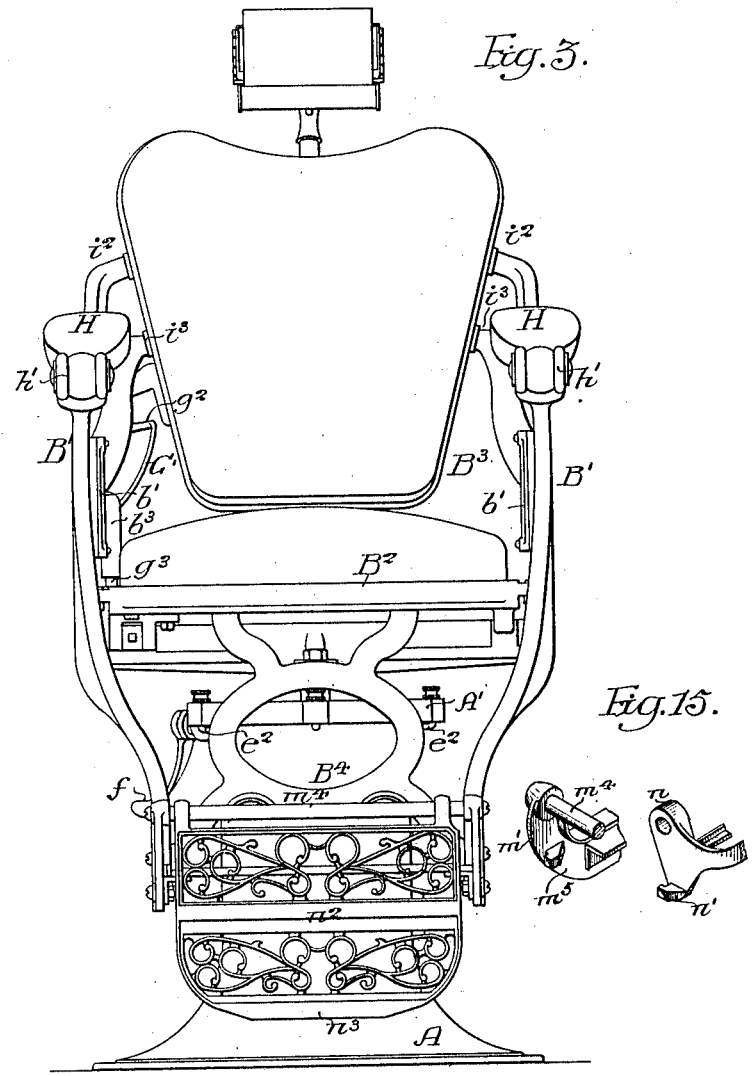
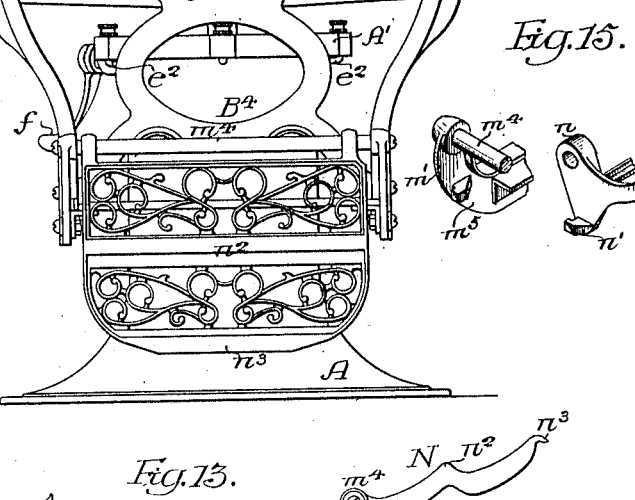
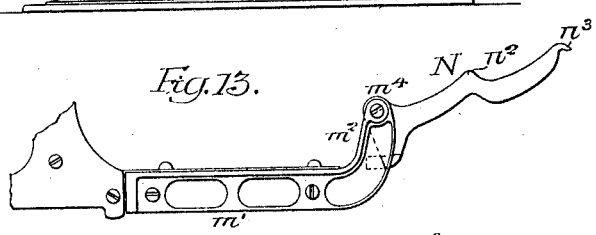
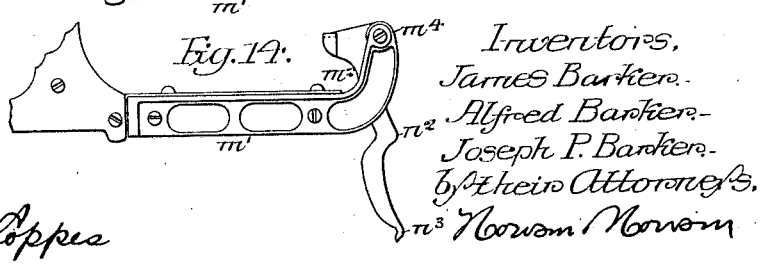

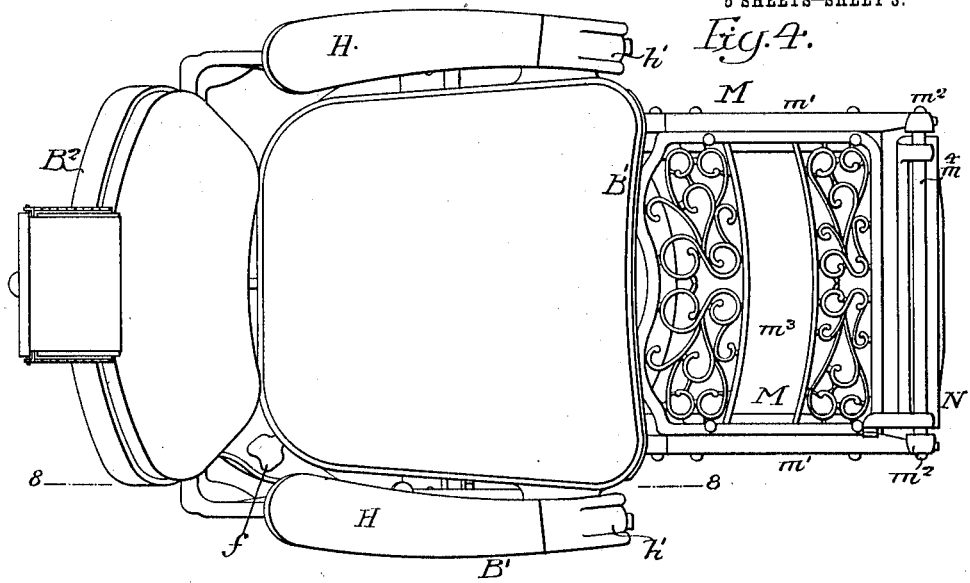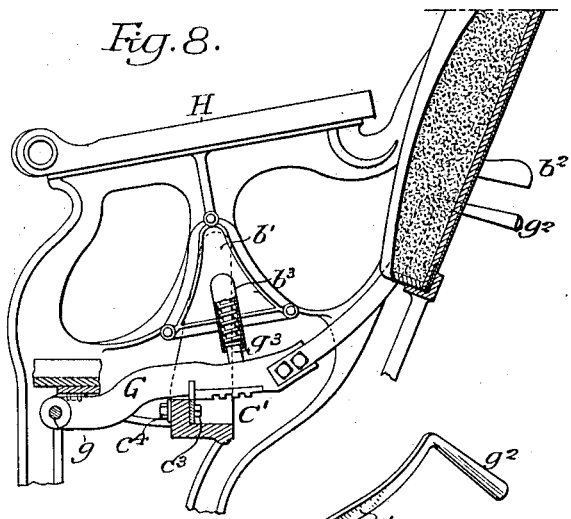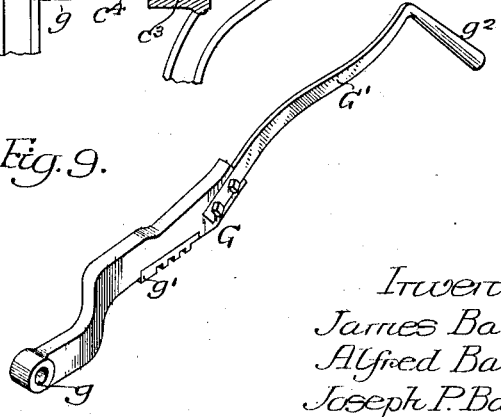

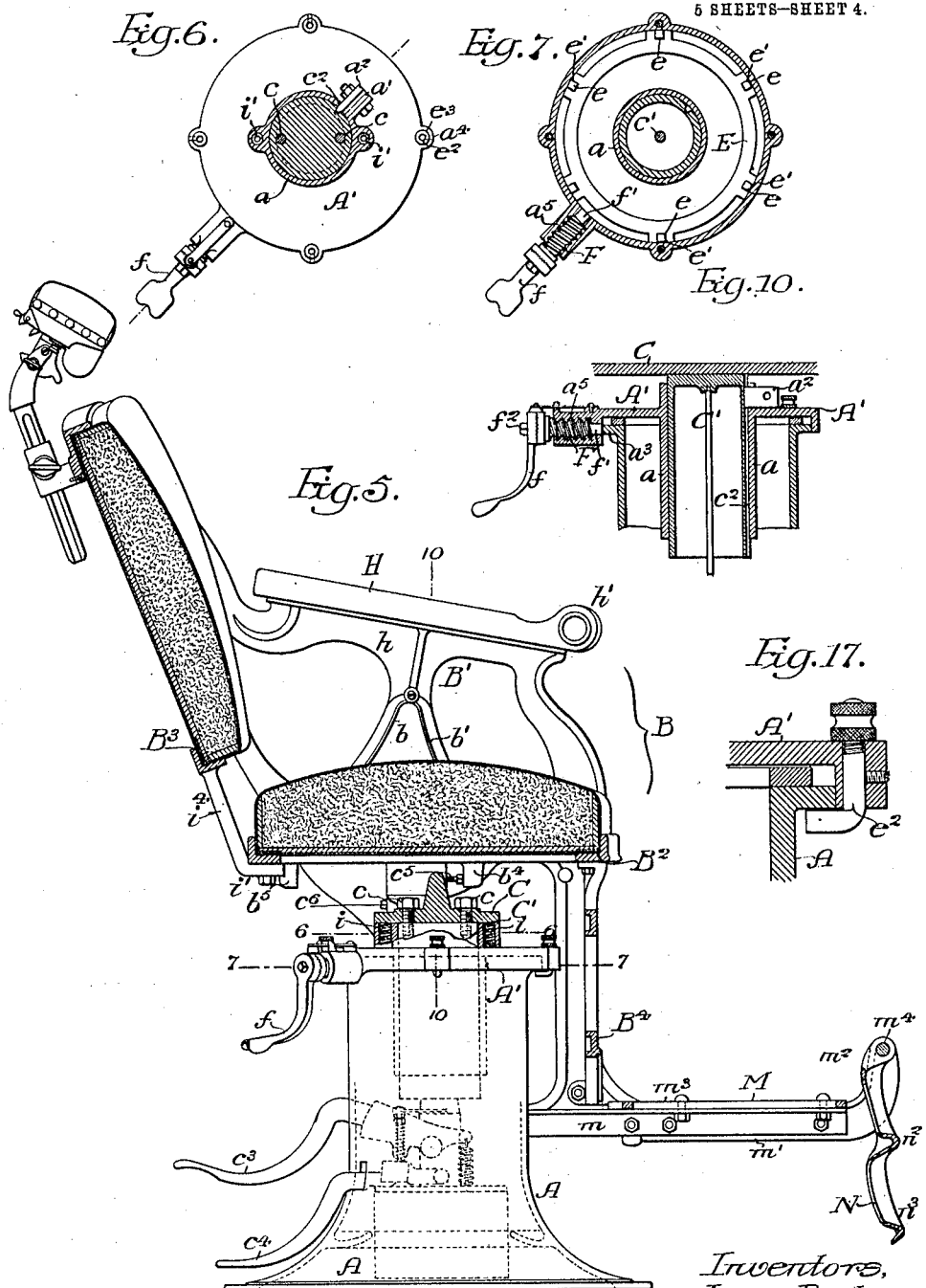

UNITED STATES PATENT OFFICE.

JAMES BARKER, ALFRED BARKER, AND JOSEPH P. BARKER, OF PHILADELPHIA, PENNSYLVANIA.

CHAIR.

1,048,274.  Specification of Letters Patent.  Patented Dec. 24, 1912.

Application filed April 29, 1907. Serial No. 370,778.

*To all whom it may concern:*

Be it known that we, JAMES BARKER, ALFRED BARKER, and JOSEPH P. BARKER, citizens of the United States, residing in Philadelphia, Pennsylvania, have invented certain Improvements in Chairs, of which the following is a specification.

The object of our invention is to so construct a chair, particularly adapted for the use of barbers, that it can be readily adjusted to the person occupying it and its position quickly and accurately controlled by the operator.

The invention, while particularly adapted for barbers' use, can be used as a dentist's or or surgeon's chair. The chair can be tilted to any angle desired; can be rotated and elevated, and is of such a construction that when in any position it is comfortable to the occupant. In describing the invention we will allude to it as a barber's chair.

The above noted advantageous ends we attain as hereinafter set forth, reference being had to the accompanying drawings, in which:—

Figure 1, is a perspective view of the improved barber's chair in its normal position; Fig. 2, is a perspective view, showing the body of the chair tilted; Fig. 3, is a front elevation; Fig. 4, is a plan view; Fig. 5, is a vertical sectional view; Fig. 6, is a sectional plan view on the line 6—6, Fig. 5; Fig. 7, is a sectional plan view on the line 7—7, Fig. 5; Fig. 8, is a sectional view on the line 8—8, Fig. 4, showing the lever for holding the body portion of the chair in the position to which it is adjusted; Fig. 9, is a perspective view of the lever illustrated in Fig. 8; Fig. 10, is a sectional view on the line 10—10, Fig. 5; Fig. 11 is a detached perspective view of the tilting portion of the chair. Fig. 12, is a detached perspective view of the swiveled portion upon which the tilting portion is mounted; Figs. 13 and 14, are side views of the pivoted foot rest; Fig. 15, is a perspective view of a portion of the foot rest, Fig. 16, is an enlarged detailed view of part of Fig. 10, and Fig. 17, is a vertical section illustrating the means for holding the bearing plate to the base.

A is the base of the structure and B is the movable body portion, which can be raised or lowered, turned on its pivot, or tilted backward to any degree desired. In the base, in the present instance, is hydraulic elevating mechanism; the details of which are set forth and claimed in an application for patent filed of even date herewith. As regards this particular application, the means for raising and lowering the body portion of the chair may be constructed in a different manner from that claimed in the application above referred to, or the chair may simply rotate upon its center without being elevated, if desired, without departing from our invention.

C is a frame to which a plunger $C'$ is attached by means of screws $c$—$c$. This plunger is adapted to slide vertically in a bearing $a$ carried by a plate $A'$ mounted on the base A and within it, as shown in Fig. 10, is a rod $c'$ on which is a piston mounted in a hydraulic cylinder, the whole being so arranged that when fluid is admitted to the cylinder on the under side of the piston, this latter will be raised, carrying with it the plunger $C'$ and the frame C to which the body portion B of the chair is pivoted. The plunger has a vertical guideway $c^2$, shown in Figs. 6 and 10, and secured to a lug $a'$ on the bearing plate $A'$ is a key $a^2$, which enters said guideway and prevents the plunger rotating independently of the plate.

In order to allow the frame C and the chair body B to freely rotate on the standard, we mount a series of rollers $e$ between a flange $a^3$ on the base A and the underside of the plate $A'$. These rollers are mounted in cavities $e'$ in a ring E, and in order to hold the bearing plate onto the base we use L-shaped bolts $e^2$, which pass through lugs $a^4$ on the bearing plate. These bolts have nuts $e^3$, and pass under the flange $a^3$ of the base, as clearly shown in Fig. 17.

In order to prevent the chair from rotating after it has been adjusted, we provide a screw bolt F, fitting the threaded opening of a boss $a^5$ at the edge of the bearing plate $A'$ and having secured to its outer end a lever $f$. The end $f'$ of the bolt bears against the edge of the flange $a^3$ of the base, as shown in Fig. 10, so that when the lever is shifted in one position the screw bolt is backed off from contact with the flange and allows the body of the chair to be freely rotated on its pivot, while when the lever is elevated in the opposite position the ends of the screw will come in contact with the flange $a^3$ and will hold the chair rigidly in the position to which it is adjusted. We preferably make the lever $f$ separate from the screw F, as illustrated in Fig. 16, and serrate the abutting faces of the two parts, as illustrated in said figure, so that the lever can be adjusted in respect to the screw and take the wear on the end thereof. A portion of the screw passes through the hub of the lever and a nut $f^2$ fastens said lever to the screw; the serrations immovably holding it in any position to which it is adjusted.

In order to hold the screw F in its adjusted position we secure at $f^4$ a spring plate $f^3$ to the boss on the bearing plate and on the extreme end of the spring plate $f^3$ place a pad $f^6$ of leather or other suitable material, which bears upon the hub of the screw, as clearly illustrated in Fig. 16, so that when the screw is backed off it will be held clear of the flange of the base by the spring plate $f^3$. The lever $f$ is so formed and is in such a position that it can be readily shifted by the foot, but it is also in reach of the hand, if desired.

A lever $c^3$ is connected with the pump which forces the fluid into the main cylinder to elevate the chair and $c^4$ represents a foot lever connected to the relief valve for allowing the fluid to escape from the cylinder when it is desired to lower the chair. Both of these levers $c^3$ and $c^4$ are foot levers and are so situated that they can be readily operated without disturbing the occupant of the chair.

The frame C has arms $C^2$ at each side, as illustrated clearly in Fig. 12, and these are rounded at the upper end to fit in sockets $b$—$b$ in the side frames B' of the body portion B of the chair, as illustrated in Figs. 8 and 11. These sockets are formed in the casing of the arms B' of the chair and we provide cap plates $b'$ secured to the arm by screws to close the sockets so as to form a smooth finish on the inside of the chair. The sockets are tapered to allow the body portion to swing a given distance so that it may be moved to permit the occupant to sit in an upright position, or may be tilted back into a position for shaving.

The body portion of the chair can be locked in different positions by a lever G, pivoted at $g$ to the body, as shown in Fig. 8. This lever has a notched plate $g'$ secured to it, as illustrated in Fig. 9, which engages a plate $c^3$ secured to the cross member of the frame C by a bolt and nut $c^4$. Said lever also has a curved extension G' provided with a hand hold $g^2$ projecting at the rear of the chair directly under a projection $b^2$ secured rigidly to the back frame of the chair. By grasping the two projections $g^2$ and $b^2$ by the hand the lever G can be raised clear of the plate $c^3$ and the body portion of the chair is free to swing on its pivot. A spring plunger $g^3$ having a spring mounted in a projection $b^3$ on the cover plate $b'$ forces the lever G down and causes it to engage the plate $c^3$, as soon as the lever is released by hand. This latter plate can be readily removed when it becomes worn and a new plate substituted for it.

On each side of the frame are set screws $c^5$ engaged by a lug $b^4$ on the chair frame B when the chair is in its normal position and on the rear of the cross member of the frame $c$ are stops $c^6$ which strike against the lugs $b^5$ on the frame when the body section is tilted to its extreme position.

The body portion of the chair is made up of two side members B'—B', a seat frame $B^2$, and a back frame $B^3$. The seat members are curved and are preferably shaped in the manner clearly illustrated in Figs. 1 and 2, having a bearing plate $h$ for the arm rest H inclined as illustrated in Fig. 5; the arm rest being higher at the rear of the seat than at the forward end. The end of the arm rest preferably has a knob $h'$ which can be readily grasped by the occupant of the chair. This inclination of the arm is an important feature, as great care has been exercised in arranging it and constructing it so that it will be comfortable to the occupant of the chair whether the seat is in its normal position or whether it is tilted, as in Fig. 2. In most barbers' chairs the arm rests are fixed, while the seat and back sections only are tilted, so that the arm is not in the same position when the body is tilted as when it is in an upright position. By having the arm rests form part of the tilting portion of the chair they can be made so that they will accommodate the arms of the occupant and will be very comfortable when the chair is tilted.

The seat frame $B^2$ is secured to the back side frames by screws passing through lugs $i'$—$i'$ on the seat section and back frame at the forward end of the chair, while the back frame is secured to the side members at $i^2$, $i^3$, and to the seat member by arms $i^4$, forming part of the back section. These arms are shaped to project under the seat section and are secured thereto by bolts, making a very substantial construction.

It will be noticed that the side members extend down at each side of the chair and support the platform M forming part of the foot rest of the chair. Secured to each side member is an angle bar $m$, which projects at each side and to which is secured the side bars $m'$—$m'$, in which are bearings $m^2$. The outer ends are turned up, as shown in Fig. 5, and to these is hinged the pivoted section N of the foot rest. A plate $m^3$ is mounted on the upper flanges of the angle bars and has secured to it screws or other fastenings, being preferably ornamented, as shown, so as to give a pleasing appearance to the chair. A pivot bar $m^4$ extends from one bearing $m^2$ to the other, and has upon it the pivot section N of the foot rest mentioned above. This section is free to swing on the bar, as shown in Fig. 5, or it can be adjusted so as to project, as shown in Figs. 5 and 14, or can be arranged to project as shown in Figs. 1, 2 and 13. The width of the pivot section N is slightly less than the space between the bearings $m^2$, as shown in Fig. 4, so that it can be moved laterally a given distance. With this construction we provide a lipped lug $n'$ on one of the arms $n$ of the pivot section N, and form a lug $m^5$ on one of the bearings $m^2$, as shown in Fig. 15, so that when the pivoted foot section N is raised and moved laterally, its lipped lugs $n'$ will engage the lipped lug $m^5$ on the fixed bearing $m^2$, holding the section N in its raised position, as illustrated in Fig. 13; the lips on the lugs preventing it from moving laterally. When it is desired to drop the section N of the foot rest, as in Fig. 14, all that is necessary is to slightly raise the end of said rest, which will immediately cause the lugs to disengage and by moving the foot rest laterally, the lug on the section N will clear the fixed lug, thereby permitting the section to turn on its pivot to the position shown in Figs. 5 and 14.

It will be noticed that the foot rest section N has two transverse projecting ribs $n^2$, $n^3$, and with the cross bar $n^4$ forms three rests for the heel of the person occupying the chair, so that if a short person is occupying the chair the cross bar $m^4$ can be used, while if the occupant is a tall person then the rib $n^3$ can be used; the space between the ribs being shaped so as to make a comfortable rest for the foot.

The object of making the section N pivoted is to allow the foot rest to be dropped, as in some localities the shoes of the occupant of the barber's chair are shined while the person is being shaved and it allows the shoe polisher to place his foot support or box in proper position for the feet to rest upon it without said support or box being connected with the chair.

In order to connect the lower portions of the side members of the frame B, we form an open ornamental frame $B^4$, which is secured to the side sections $B^2$ and to the lower portions of the side members $B'$, as illustrated in Figs. 3 and 5.

We preferably provide the cap plate with sockets in which are mounted cushion springs $i$, resting against the base of the frame which supports the body portion so that when said frame is lowered, the springs prevent it from striking a blow against the bearings on the cap plate.

We claim:

1. The combination of a base having a flange, a cap, a chair frame supported by the cap, said cap resting upon the base, a boss on the edge of the cap overhanging the flange of the base, a screw in the boss, said screw being adapted to rest against the flange, and a lever on the screw so that when the lever is moved in one position the plate will be held from turning on the base, and when moved in the opposite position the screw will be backed off and the plate will be free to be turned on the base.

2. The combination of a base having a flange, a cap mounted on the base, a chair frame carried by the cap, a boss on the cap overhanging the flange of the base, said boss having a screw threaded opening, a screw mounted in said opening arranged to bear against the flange of the base, a lever mounted on the screw, the hub of the lever and the end of the screw having intermeshing serrations, with means for fastening the lever to the screw so that said lever can be adjusted in position in respect to the screw.

3. The combination of a flanged base, a cap plate pivotally mounted on the base, a chair frame carried by the plate, a boss on the plate, a screw mounted in the boss, a lever carried by said screw, a spring plate secured to the boss, and a pad on the end of the spring plate bearing upon the screw so as to hold said screw in the position to which it is adjusted.

4. The combination of a base, a cap plate, a plunger mounted on the cap plate, a frame carried by the plunger, a body portion mounted on the frame, means for preventing the plunger turning on the cap plate and springs mounted in sockets on the cap plate acting as cushions for the frame carrying the body portion.

5. The combination of a base, a frame mounted on the base having upwardly projecting arms, a body portion mounted on the arms of the frame, a lever pivoted to the body portion and extending toward the rear of the chair, a handle on the rear portion of the lever, a notched plate secured to the lever, a plate secured to the cross member of the frame and arranged to engage with the notched portion of the lever, with a spring plunger carried by the body portion and arranged to bear upon the lever so as to force it into contact with the frame to hold the body portion in the position to which it is adjusted, substantially as described.

In testimony whereof, we have signed our names to this specification, in the presence of two subscribing witnesses.

JAMES BARKER.
ALFRED BARKER.
JOSEPH P. BARKER.

Witnesses:
Jos. H. Klein,
Wm. A. Barr.